(12) United States Patent
Niu et al.

(10) Patent No.: US 12,468,476 B2
(45) Date of Patent: Nov. 11, 2025

(54) HYBRID MEMORY MANAGEMENT SYSTEMS AND METHODS WITH IN-STORAGE PROCESSING AND ATTRIBUTE DATA MANAGEMENT

(71) Applicant: Alibaba Group Holding Limited, Grand Cayman (KY)

(72) Inventors: Dimin Niu, Sunnyvale, CA (US); Tianchan Guan, Shanghai (CN); Hongzhong Zheng, Los Gatos (CA); Shuangchen Li, Sunnyvale, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 18/269,541

(22) PCT Filed: Dec. 24, 2020

(86) PCT No.: PCT/CN2020/139163
§ 371 (c)(1),
(2) Date: Jun. 23, 2023

(87) PCT Pub. No.: WO2022/133955
PCT Pub. Date: Jun. 30, 2022

(65) Prior Publication Data
US 2024/0078036 A1    Mar. 7, 2024

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0604; G06F 3/0655; G06F 3/0679; G06F 12/0284; G06F 2212/1024;
(Continued)

(56) References Cited

U.S. PATENT DOCUMENTS

| | | |
|---|---|---|
| 10,474,618 B2 | 11/2019 | Anderson et al. |
| 10,691,593 B1 | 6/2020 | Korzh |

(Continued)

FOREIGN PATENT DOCUMENTS

| | | |
|---|---|---|
| CN | 103324441 A | 9/2013 |
| CN | 106168928 A | 11/2016 |

(Continued)

*Primary Examiner* — Larry T Mackall

(57) ABSTRACT

A memory module can include a hybrid media controller coupled to a volatile memory, a non-volatile memory, a non-volatile memory buffer and a set of memory mapped input/output (MMIO) register. The hybrid media controller can be configured for reading and writing data to a volatile memory of a memory mapped space of a memory module. The hybrid media controller can also be configured for reading and writing bulk data to a non-volatile memory of the memory mapped space. The hybrid media controller can also be configured for reading and writing data of a random-access granularity to the non-volatile memory of the memory mapped space. The hybrid media controller can also be configured for self-indexed moving data between the non-volatile memory and the volatile memory of the memory module.

23 Claims, 6 Drawing Sheets

---

610
Receive self-indexed data movement operation into the set of MMIO registers

620
Generate volatile memory address based on self-indexed data movement operation in the set of MMIO registers and read sampling results from volatile memory at the generated volatile memory address by the hybrid media controller 630
Calculate non-volatile memory address from volatile memory address, fetch attributes from calculated non-volatile memory address, store the attributes in the volatile memory and set a status in the set of MMIO registers by the hybrid media controller

(58) Field of Classification Search
CPC ......... G06F 2212/205; G06F 2212/206; G06F 2212/7203
See application file for complete search history.

(56) References Cited

U.S. PATENT DOCUMENTS

| | | | |
|---|---|---|---|
| 10,825,534 B2 | 11/2020 | Nale | |
| 10,838,637 B2 | 11/2020 | Burns et al. | |
| 11,561,739 B1* | 1/2023 | Marino | G06F 11/1446 |
| 2002/0136078 A1* | 9/2002 | Garner | G06F 12/0246 |
| | | | 711/E12.008 |
| 2008/0133821 A1 | 6/2008 | Ganesan et al. | |
| 2012/0084484 A1* | 4/2012 | Post | G06F 12/0246 |
| | | | 710/308 |
| 2017/0139036 A1* | 5/2017 | Nayyar | G01S 13/343 |
| 2019/0279711 A1 | 9/2019 | Shimizu | |
| 2019/0347204 A1 | 11/2019 | Du et al. | |
| 2020/0004445 A1 | 1/2020 | Benisty | |
| 2020/0133669 A1 | 4/2020 | Qawami et al. | |
| 2020/0211640 A1 | 7/2020 | Sharon et al. | |
| 2020/0218527 A1 | 7/2020 | Ganesan et al. | |
| 2020/0243486 A1 | 7/2020 | Quader et al. | |
| 2020/0272588 A1 | 8/2020 | Curtis | |
| 2020/0273504 A1 | 8/2020 | Mori et al. | |
| 2020/0278940 A1 | 9/2020 | Ross et al. | |
| 2020/0285386 A1 | 9/2020 | Nelogal et al. | |
| 2020/0311019 A1 | 10/2020 | Tomishima | |
| 2020/0356475 A1 | 11/2020 | Shallal | |
| 2020/0374142 A1 | 11/2020 | Tandon | |

FOREIGN PATENT DOCUMENTS

| | | |
|---|---|---|
| CN | 107710175 A | 2/2018 |
| CN | 110502452 A | 11/2019 |

* cited by examiner

HYBRID MEMORY MANAGEMENT SYSTEMS AND METHODS WITH IN-STORAGE PROCESSING AND ATTRIBUTE DATA MANAGEMENT

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science. A number of technologies and applications need processing units optimized for performance with large data sets, having high computational intensity and high memory bandwidth. Graph processing applications, for example, include structure data and feature data. Structure data is characterized by relatively small data size, random data access utilizing relatively small access granularity. Therefore, volatile memory, such as dynamic random-access memory, is generally utilized for storing structure data. Feature data is characterized by relatively large data size, less random access and larger access granularity. Therefore, non-volatile memory, such as flash memory, is generally utilized for storing feature data. In applications, such as graph computing, a memory system with multiple memory channels for accessing data in both non-volatile memory and non-volatile memory is needed.

SUMMARY OF THE INVENTION

The present technology may best be understood by referring to the following description and accompanying drawings that are used to illustrate embodiments of the present technology directed toward hybrid memory management with in-storage processing and attribute data management.

In one embodiment, a memory module can include a volatile memory, a non-volatile memory, a non-volatile memory buffer, a set of memory mapped input/output (MMIO) registers, and a hybrid media controller. The set of MMIO register can include a feature size register configured to hold a number of bytes of each feature, an index base register configured to hold a sampled node location, an index count register configured to hold a number of sampled node location, a target base register configured to hold a volatile memory address for storing one or more features, an operation register configured to hold an operation code, and a status register configure to hold a current non-volatile memory read/write controller status. The hybrid media controller can be configured to provide read and write access to the volatile memory, bulk read and write access to the non-volatile memory, read and write random access to the non-volatile memory, and self-indexed data movement between the non-volatile memory and the volatile memory utilizing the set of MMIO registers.

In one embodiment, a method of accessing data can include reading and writing data to a volatile memory of a memory mapped space of a memory module. The method can also include reading and writing bulk data to a non-volatile memory of the memory mapped space of the memory module. The method can also include reading and writing data of a random-access granularity to the non-volatile memory of the memory mapped space of the memory module. The method can also include self-indexed moving data between the non-volatile memory and the volatile memory of the memory module.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
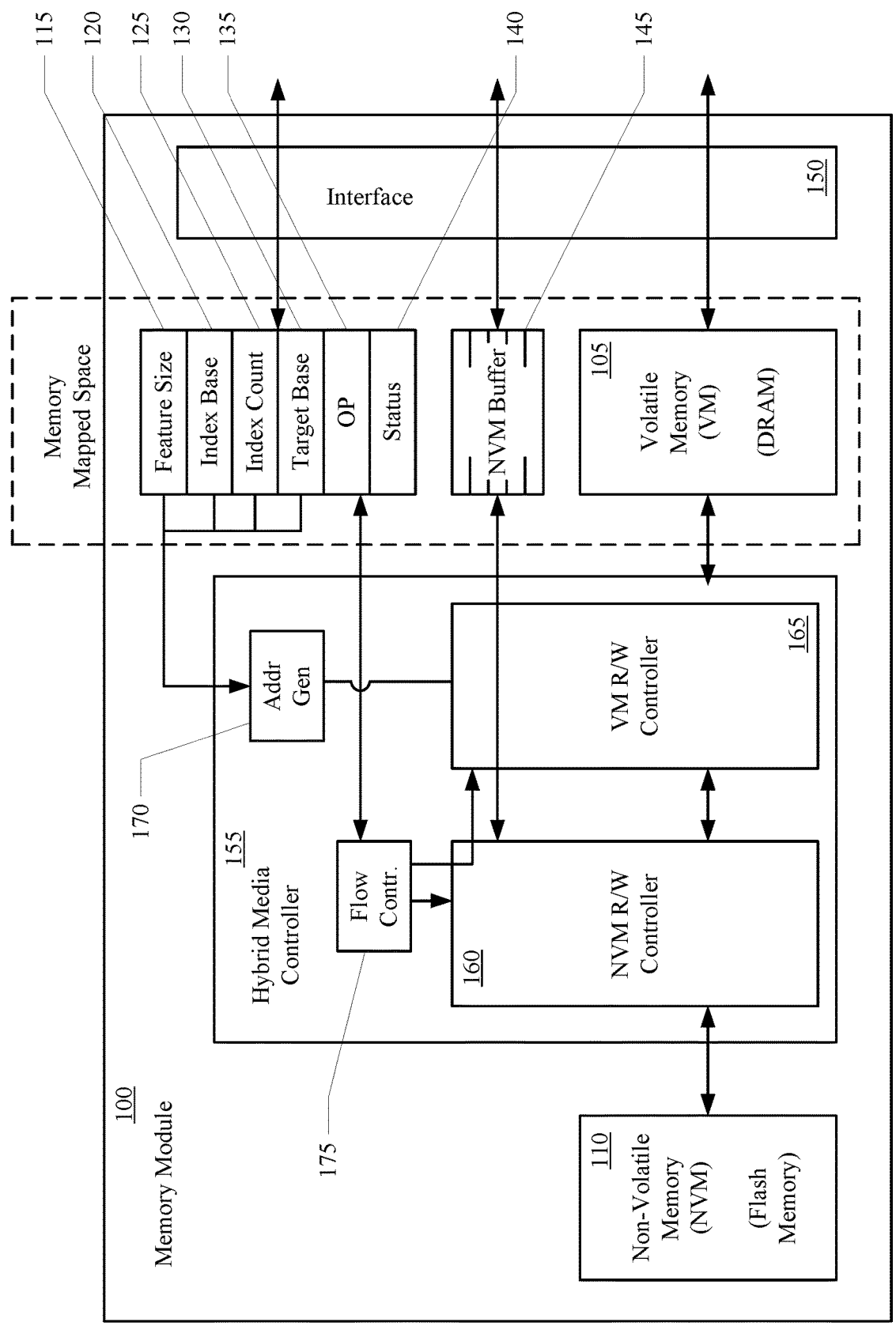
FIG. 1 shows a memory module, in accordance with aspects of the present technology.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Computing devices for performing artificial intelligence, machine learning, deep learning, neural network (NN) processing, graph neural network (GNN) processing and other such applications have a need to access both volatile and non-volatile memory. For example, a computing device performing graph neural network (GNN) processing can have a need to access volatile memory for graph sampling and graph structure update. Such computing device can also need bulk access non-volatile memory for graph construction. The computing device can also need random access to non-volatile memory for graph feature updates. The computing device can also need to move data between non-volatile memory and volatile memory for feature read after sampling. Aspects of the present technology provide unified memory access devices and techniques that include read/write access to volatile memory, bulk read/write and random read/write access to non-volatile memory, and data movement between non-volatile memory and volatile memory.

FIG. 1 shows a memory module, in accordance with aspects of the present technology. The memory module 100 can include volatile memory (VM) 105 and non-volatile memory (NVM) 110. In one implementation, the volatile memory 105 can be dynamic random-access memory (DRAM), and the non-volatile memory 110 can be flash memory (FLASH), Phase change memory (PCM) or the like. The memory module 100 can further include a set of memory mapped input/output (MMIO) registers 115-140, a non-volatile memory buffer 145, an interface 150 and hybrid media controller 155. The set of memory mapped input/output (MMIO) register 115-140, the non-volatile memory buffer 145 and the volatile memory 105 can comprise a memory mapped space of the memory module 100. The memory mapped input/output (MMIO) registers 115-140, non-volatile memory buffer 145, interface 150 and hybrid media controller 155 of the memory module 100 can be configured to provide read/write access to the volatile memory 105, bulk read/write access to the non-volatile memory 110, read/write random access of a random-access granularity to the non-volatile memory 110, and self-indexed data movement between the non-volatile memory 110 and the volatile memory 105.

The hybrid media controller 155 can include a non-volatile memory read/write controller 160, a volatile memory read/write controller 165, an address generator 170 and a flow controller 175. The memory mapped input/output (MMIO) registers 115-140 can include, but are not limited to, a feature size register 115, an index base register 120, an index count register 125, a target base register 130, an operation register 135, and a status register 140. The feature size register 115 can be configured to hold a number of bytes of each feature. The index base register 120 can be configured to hold a sampled node location. The index count register 125 can be configured to hold a number of sampled node locations. The target base register 130 can be configured to hold a volatile memory address for storing one or more features. The operation register 135 can be configured to hold an operation code. The status register 140 can be configured to hold a current memory read/write controller status. The non-volatile memory buffer 145 can be configured to hold data for read and write access to the non-volatile memory 110. In one implementation, the non-volatile memory buffer 145 can be a set of ping-pong buffers with a size of a block of the non-volatile memory 110. The memory mapped input/output (MMIO) registers 115-140 can also optionally include, but is not limited to, a random-access data buffer (not shown). The random-access data buffer can be configured to hold data of a random-access granularity for read and write access to the volatile memory 105. In another implementation, a given portion of the non-volatile memory buffer 145 can be utilized to hold data of a random-access granularity for read and write access to the volatile memory 105.

In one implementation, the volatile memory 105, non-volatile memory 110, set of memory mapped input/output (MMIO) registers 115-140, non-volatile memory buffer 145, interface 150 and hybrid media controller 155 of the memory module 100 can be implemented as a system-in-package (SiP). In another implementation, the volatile memory 105, non-volatile memory 110, set of memory mapped input/output (MMIO) registers 115-140, non-volatile memory buffer 145, interface 150 and hybrid media controller 155 of the memory module 100 can be implemented as a peripheral card with a dual in-line memory module (DIMM) form-factor and interface. In another implementation, the volatile memory 105, non-volatile memory 110, set of memory mapped input/output (MMIO) registers 115-140, non-volatile memory buffer 145, interface 150 and hybrid media controller 155 of the memory module 100 can be implemented as a peripheral card such as, but not limited to, a peripheral component interface express (PCIe) card.

The memory module 100 can be configured to provide unified memory access including read/write access to volatile memory, bulk read/write access to non-volatile memory, random access to non-volatile memory and self-indexed data movement between non-volatile memory and volatile memory. The memory module 100 can provide read/write access to volatile memory for graph sampling and graph structure update. The memory module 100 can provide bulk read/write access non-volatile memory for graph construction. The memory module 100 can provide random read/write access to non-volatile memory for graph feature updates. The memory module 100 can also provide data movement between non-volatile memory and volatile memory for feature read after sampling.

Figure 2A:
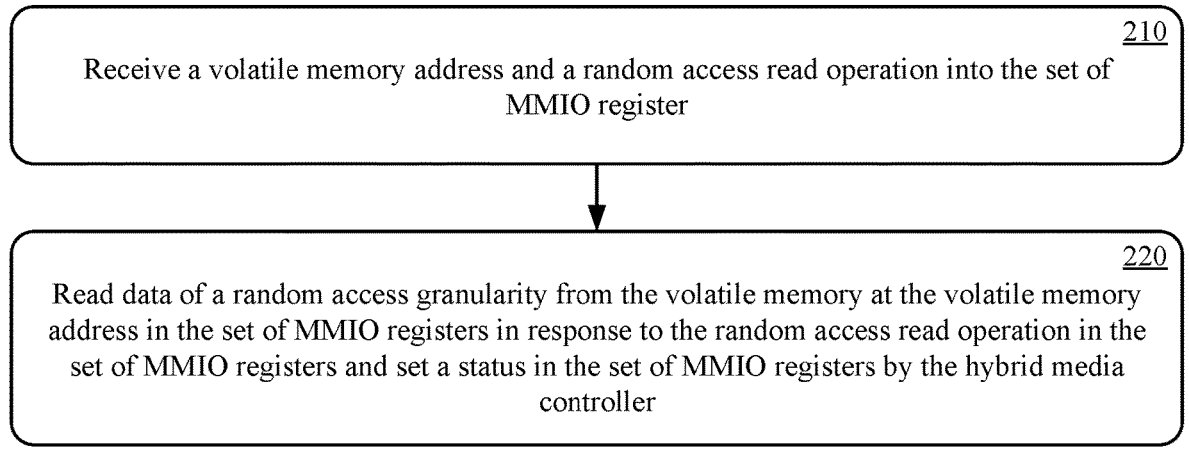
FIGS. 2A and 2B illustrate read/write access to the volatile memory of a memory module, in accordance with aspects of the present technology.

Operation of the memory module 100 will be further described with reference to FIGS. 2A and 2B, 3A and 3B, 4A and 4B, and 5. Referring now to FIG. 2A, read access to the volatile memory 105, in accordance with aspects of the present technology, is illustrated. The read access can include receiving a volatile memory address and a random access read operation into the set of MMIO registers 115-140 through the interface 150 of the memory module 100, at 210. In one implementation, a host can program the target register 130 with a volatile memory address and the operation register 135 with a random access read command. At 220, data of a random access granularity can be read from the volatile memory 105 at the volatile memory address in the set of MMIO registers 115-140 in response to the random access read operation in the set of MMIO registers 115-140, and a status in the set of MMIO registers 115-140 can be set by the hybrid media controller 155. The data of the random-access granularity can be a predetermine amount of data, such as a byte, word or page of data. In one implementation, the volatile memory read/write controller 165 can read the data of the random-access granularity from the volatile memory 105 and feed the bulk data into a data buffer, such as a dedicated register. The volatile memory read/write controller 165 can also send a signal to the flow control module 175 to indicate that the data of the random-access granularity is in the buffer. The flow control module 175 can set the state register 140 to a given state to indicate that the bulk data is done being loaded into the buffer. The host can poll the status register 140 and read the data of the random access granularity from the buffer through the interface 150 when the status register 140 is set to the given state indicating that the bulk data loading is done.

Figure 2B:
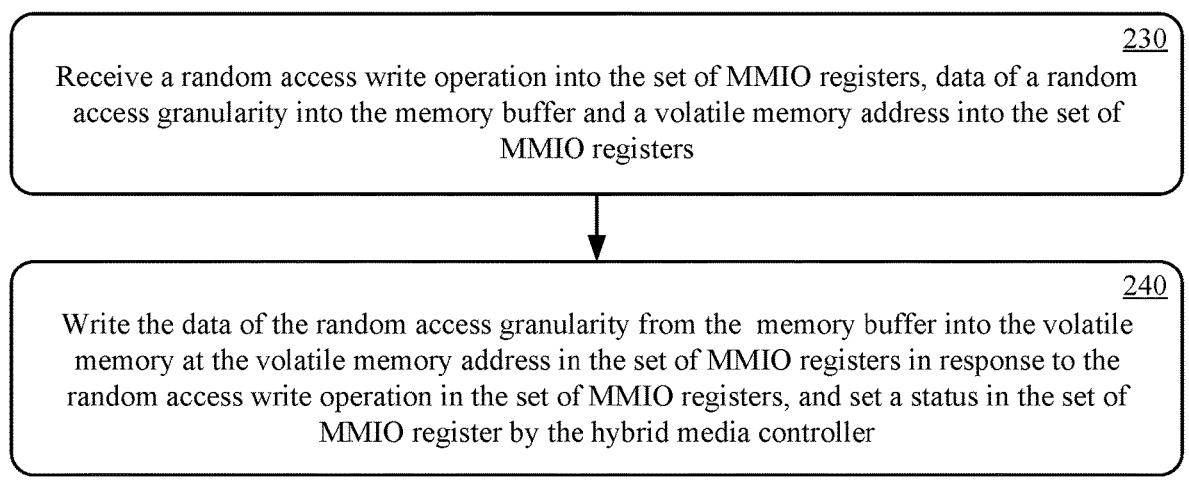

Referring now to FIG. 2B, write access to the volatile memory 105, in accordance with aspects of the present technology, is illustrated. The write access can include receiving a random access write operation into the set of MMIO registers 115-140, data of a random-access granularity into a given buffer, and a volatile memory address into the set of MMIO registers 115-140 through the interface 150 of the memory module 100, at 230. The data of the random-access granularity can be a predetermine amount of data, such as a byte, word or page of data. The given buffer can be a dedicated register or a given portion of the non-volatile memory buffer 145 that can be re-used for each random access read operation. In one implementation, the host can send data of a random-access granularity to a buffer, program the target register 130 with a volatile memory address and the operation register 135 with a random access write command. At 240, the data of the random-access granularity can be written from the buffer into the non-volatile memory 105 at the volatile memory address in the set of MMIO register 115-140 in response to the random access write operation in the set of MMIO registers 115-140, and set a status in the set of MMIO register 115-140 by the hybrid media controller 155. In one implementation, the volatile memory read/write controller 165 can write data of the random-access granularity from the buffer to the volatile memory 105. The volatile memory read/write controller 165 can send a done signal to the flow control module 175 when the data of the random-access granularity has been written to the volatile memory 105. The flow control module 175 can set the status register 140 to a given state indicating that the random-access data write operation is complete. Accordingly, the MMIO registers, 115-140, non-volatile memory buffer 145, volatile memory read/write controller 165 and flow control module 175 of the memory module 100 can provide random read/write access to volatile memory. In one implementation, the random read/write access to volatile memory can be utilized for graph sampling and graph structure update for graph neural network (GNN) applications.

Figure 3A:
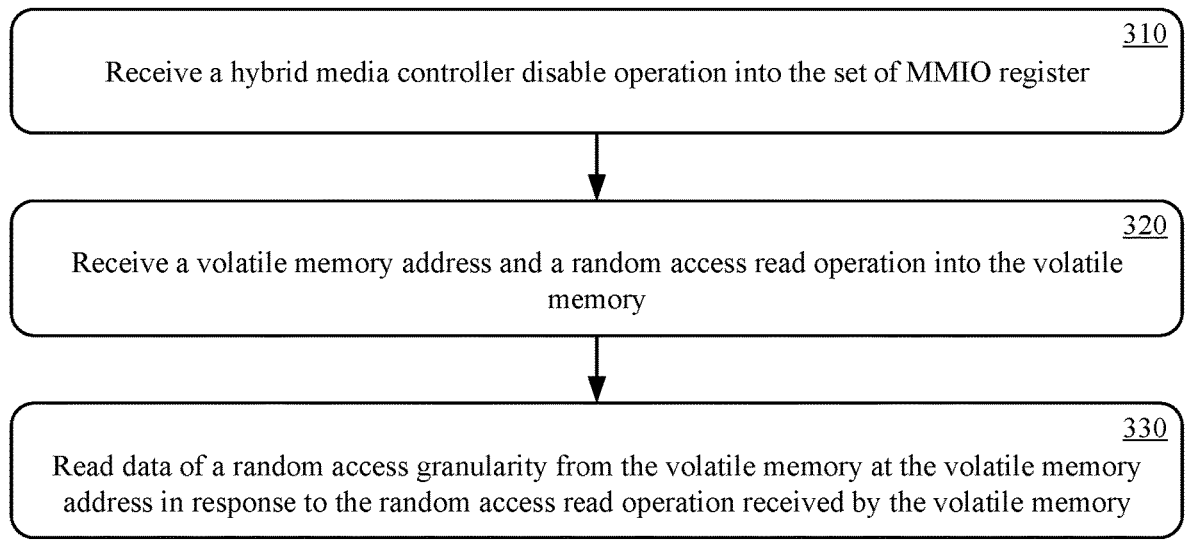
FIGS. 3A and 3B illustrate read/write access to the volatile memory of a memory module, in accordance with aspects of the present technology.

Referring now to FIG. 3A, a read access to the volatile memory 150, in accordance with aspects of the present technology, is illustrated. The read access can include receiving a hybrid media controller disable operation into the set of MMIO registers 115-140, at 310. In one implementation, a host can program the operation register 135 with a hybrid media controller read disable command. The hybrid media controller 155 can be disabled to permit direct read access to the volatile memory 105, such as RAM. At 320, a volatile memory address and a random access read operation can be receiving into the volatile memory 105 through the interface 150 of the memory module 100. At 320, data of a random access granularity can be read from the volatile memory 105 at the volatile memory address in response to the random access read operation received by the volatile memory. The data of the random-access granularity can be a predetermine amount of data, such as a byte, word or page of data.

Figure 3B:
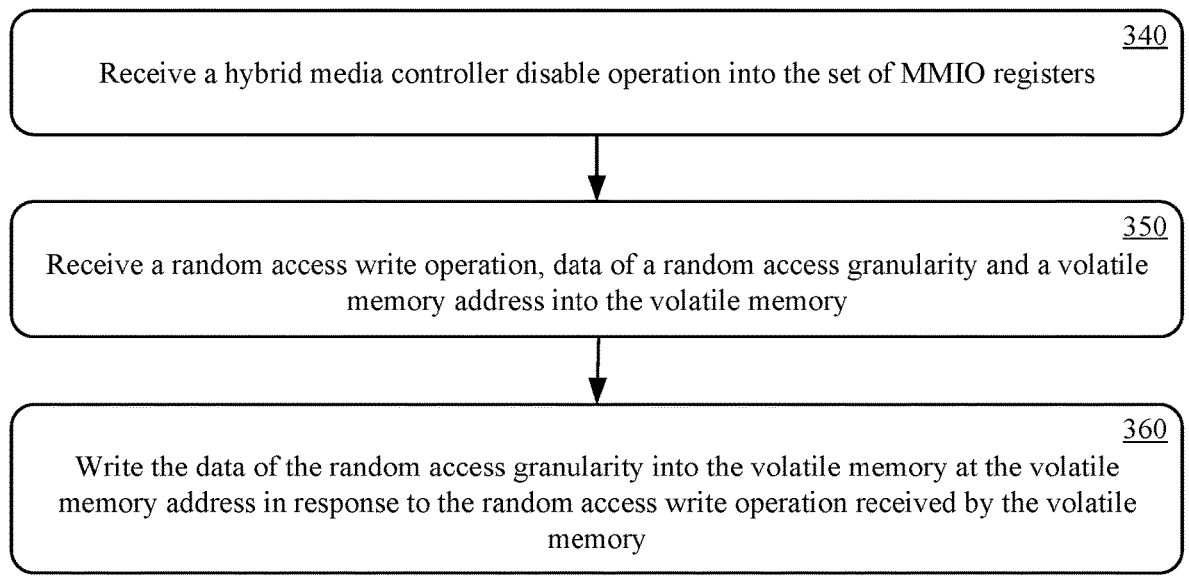

Referring now to FIG. 3B, write access to the volatile memory 105, in accordance with aspects of the present technology, is illustrated. The write access can include receiving a hybrid media controller disable operation into the set of MMIO registers 115-140, at 340. In one implementation, a host can program the operation register 135 with a hybrid media controller write disable command. The hybrid media controller 155 can be disabled to permit direct write access to the volatile memory 105, such as RAM. At 350, a random access write operation, data of a random access granularity, and a volatile memory address can be received into the volatile memory 105 through the interface 150 of the memory module 100. The data of the random-access granularity can be a predetermine amount of data, such as a byte, word or page of data. At 360, the data of the random-access granularity can be written into the non-volatile memory 105 at the volatile memory address in response to the random access write operation received by the volatile memory 105. Accordingly, the MMIO registers, 115-140 of the memory module 100 can provide random read/write access to volatile memory. In one implementation, the random read/write access to volatile memory can be utilized for graph sampling and graph structure update for graph neural network (GNN) applications.

Figure 4A:
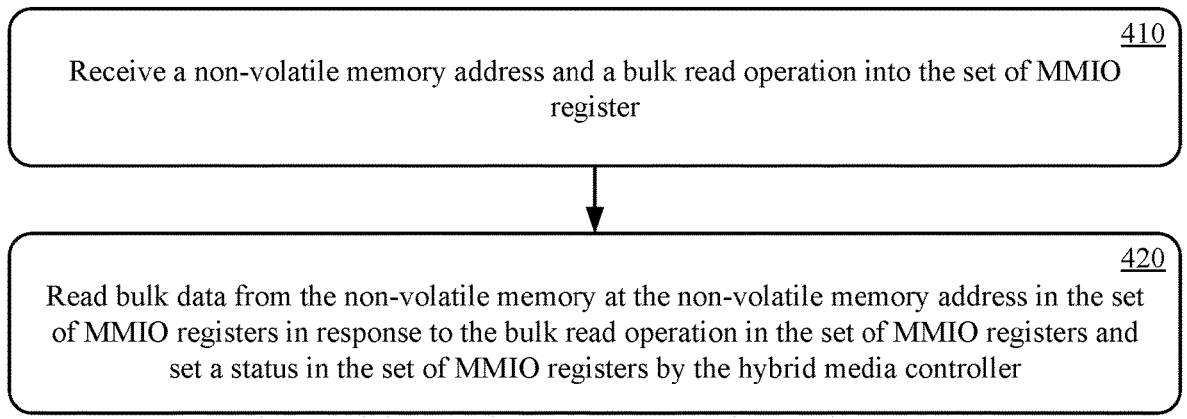
FIGS. 4A and 4B illustrate bulk read/write access to non-volatile memory of a memory module, in accordance with aspects of the present technology.

Referring now to FIG. 4A, bulk read access to the non-volatile memory 110, in accordance with aspects of the present technology, is illustrated. The bulk read access can include receiving a non-volatile memory address and a bulk read operation into the set of MMIO registers 115-140 through the interface 150 of the memory module 100, at 410. In one implementation, a host can program the target register 130 with a non-volatile memory address and the operation register 135 with a bulk read command. At 420, bulk data can be read from the non-volatile memory 110 at the non-volatile memory address in the set of MMIO registers 115-140 in response to the bulk read operation in the set of MMIO registers 115-140, and a status in the set of MMIO registers 115-140 can be set by the hybrid media controller 155. In one implementation, the non-volatile memory read/write controller 160 can read bulk data from the non-volatile memory 110 and feed the bulk data into the non-volatile memory buffer 145. The non-volatile memory read/write controller 160 can also send a signal to the flow control module 175 to indicate that that the bulk data is in the non-volatile memory buffer 145. The flow control module 175 can set the state register 140 to a given state to indicate that the bulk data is done being loaded into the non-volatile memory buffer 145. The host can poll the status register 140 and read the bulk data from the non-volatile memory buffer 145 through the interface 150 when the status register 140 is set to the given state indicating that the bulk data loading is done.

Figure 4B:
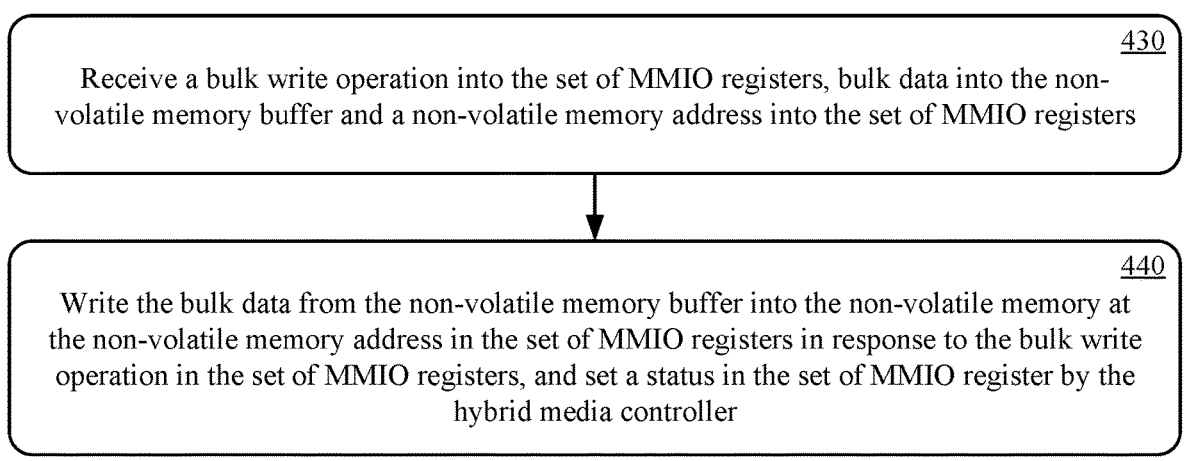

Referring now to FIG. 4B, bulk write access to the non-volatile memory 110, in accordance with aspects of the present technology, is illustrated. The bulk write access can include receiving a bulk write operation into the set of MMIO registers 115-140, bulk data into the non-volatile memory buffer 145, and a non-volatile memory address into the set of MMIO registers 115-140 through the interface 150 of the memory module 100, at 430. In one implementation, the host can send bulk data to the non-volatile memory buffer 145, program the target register 130 with a non-volatile memory address and the operation register 135 with a bulk write command. At 440, the bulk data can be written from the non-volatile memory buffer 145 into the non-volatile memory 110 at the non-volatile memory address in the set of MMIO register 115-140 in response to the bulk write operation in the set of MMIO registers 115-140, and set a status in the set of MMIO register 115-140 by the hybrid media controller 155. In one implementation, the non-volatile memory read/write controller 160 can write data from the non-volatile memory buffer 145 to the non-volatile memory 110. The non-volatile memory read/write controller 160 can send a done signal to the flow control module 175 when the bulk data has been written to the non-volatile memory 110. The flow control module 175 can set the status register 140 to a given state indicating that the bulk data write operation is complete. Accordingly, the MMIO registers 115-140, the non-volatile memory buffer 145, hybrid media controller 155 and non-volatile memory read/write controller 160 of the memory module 100 can provide bulk read/write access to non-volatile memory. In one implementation, the bulk read/write access to non-volatile memory can be utilized for graph construction in graph neural network (GNN) applications.

Figure 5A:
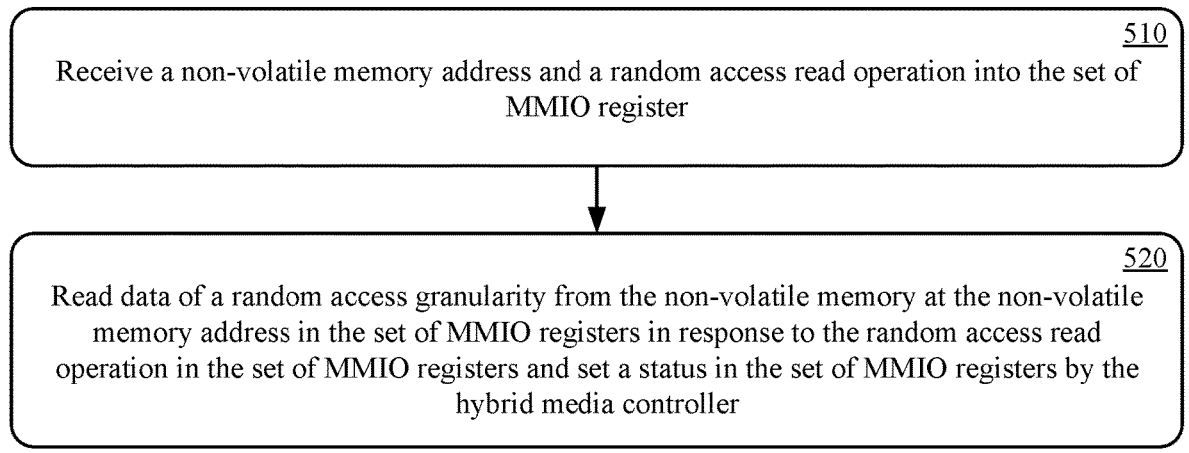
FIGS. 5A and 5B illustrate read/write access of a random-access granularity to non-volatile memory of a memory module, in accordance with aspects of the present technology.

Referring now to FIG. 5A, read to the non-volatile memory 110 at a random-access granularity, in accordance with aspects of the present technology, is illustrated. The read access can include receiving a non-volatile memory address and a random access read operation into the set of MMIO registers 115-140 through the interface 150 of the memory module 100, at 510. In one implementation, a host can program the target register 130 with a non-volatile memory address and the operation register 135 with a random access read command. At 520, data of a random access granularity can be read from the non-volatile memory 110 at the non-volatile memory address in the set of MMIO registers 115-140 in response to the random access read operation in the set of MMIO registers 115-140, and a status in the set of MMIO registers 115-140 can be set by the hybrid media controller 155. The data of the random-access granularity can be a predetermine amount of data, such as a byte, word or page of data. In one implementation, the non-volatile memory read/write controller 160 can read the data of the random access granularity from the non-volatile memory 110 and feed the bulk data into a data buffer, such as a dedicated register or a given portion of the non-volatile memory buffer 145 that can be re-used for each random access read operation. The non-volatile memory read/write controller 160 can also send a signal to the flow control module 175 to indicate that that the data of the random-access granularity is in the buffer. The flow control module 175 can set the state register 140 to a given state to indicate that the bulk data is done being loaded into the buffer. The host can poll the status register 140 and read the data of the random access granularity from the buffer through the interface 150 when the status register 140 is set to the given state indicating that the bulk data loading is done.

Figure 5B:
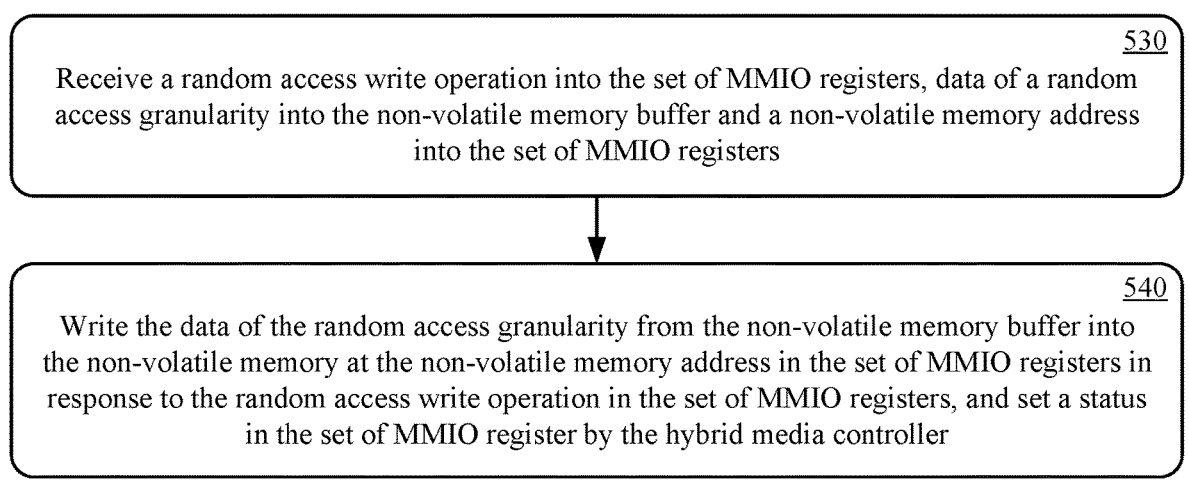

Referring now to FIG. 5B, write to the non-volatile memory 110 at a random-access granularity, in accordance with aspects of the present technology, is illustrated. The write access can include receiving a random access write operation into the set of MMIO registers 115-140, data of a random access granularity into a give buffer, and a non-volatile memory address into the set of MMIO registers 115-140 through the interface 150 of the memory module 100, at 530. The data of the random-access granularity can be a predetermine amount of data, such as a byte, word or page of data. The given buffer can be a dedicated register or a given portion of the non-volatile memory buffer 145 that can be re-used for each random access read operation. In one implementation, the host can send data of a random-access granularity to a buffer, program the target register 130 with a non-volatile memory address and the operation register 135 with a random access write command. At 540, the data of the random-access granularity can be written from the buffer into the non-volatile memory 110 at the non-volatile memory address in the set of MMIO register 115-140 in response to the random access write operation in the set of MMIO registers 115-140, and set a status in the set of MMIO register 115-140 by the hybrid media controller 155. In one implementation, the non-volatile memory read/write controller 160 can write data of the random-access granularity from the buffer to the non-volatile memory 110. The non-volatile memory read/write controller 160 can send a done signal to the flow control module 175 when the data of the random-access granularity has been written to the non-volatile memory 110. The flow control module 175 can set the status register 140 to a given state indicating that the random-access data write operation is complete. Accordingly, the MMIO register 115-140, hybrid media controller 155, non-volatile memory read/write controller 160 and flow control module 175 of the memory module 100 can provide random read/write access to non-volatile memory. In one implementation, the random read/write access to non-volatile memory can be utilized for graph sampling and graph structure updates in graph neural network (GNN) applications.

Figure 6:
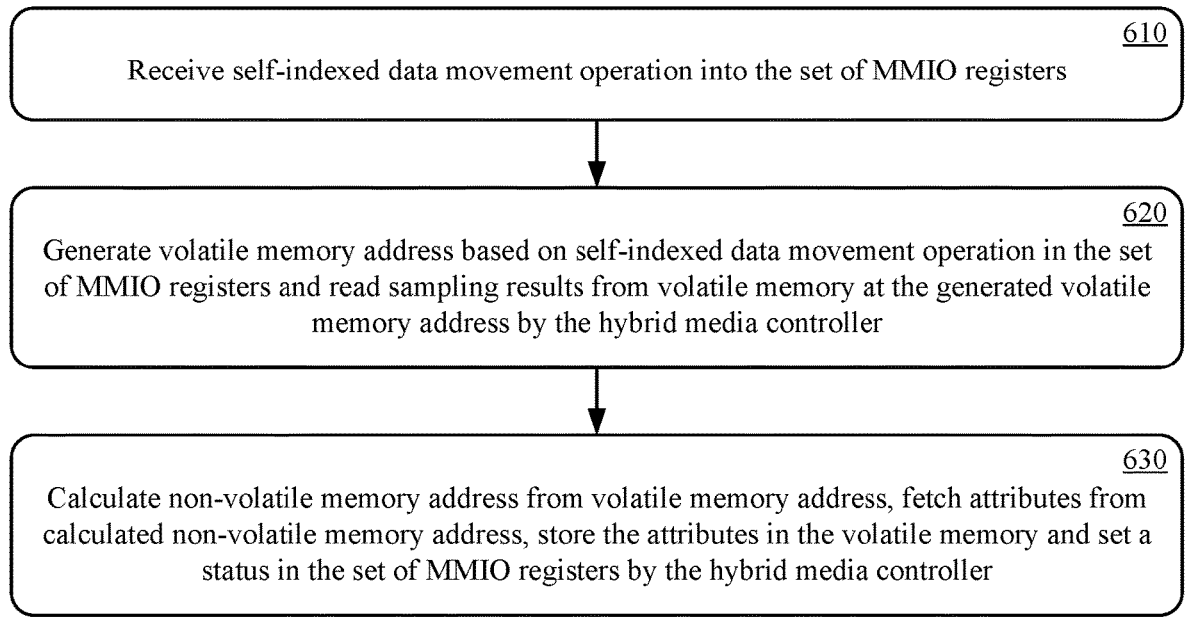
FIG. 6 illustrates self-indexed data movement between non-volatile memory and volatile memory of a memory module, in accordance with aspects of the present technology.

Referring now to FIG. 6, self-indexed data movement between the non-volatile memory 110 and the volatile memory 105, in accordance with aspects of the present technology, is illustrated. The data movement can include receiving a self-indexed data movement operation into the set of MMIO registers 115-140, at 610. In one implementation, a host can program the index base register 120 with a sample node location, the index count register 125 with a number of sampled nodes, the target register 130 with a volatile memory address to store features, and the operation register 135 with a self-indexed data movement command. At 620, a volatile memory address can be generated based on the self-indexed data movement operation in the set of MMIO register 115-140 and sampling results can be read from the volatile memory 150 at the generated volatile memory address by the hybrid media controller 155. In one implementation, the address generator 170 can generate the volatile memory address from the sample node location in the index base register 120, the number of sample nodes in the index count register 124, and the volatile memory address for storing feature in the target register 130. The volatile memory read/write controller 165 can send the generated volatile memory address to the volatile memory 105. In one implementation, the address generator 170 can calculate a non-volatile memory address from the sampling results from the volatile memory 105. At 630, a non-volatile memory address can be calculated from the volatile memory address, attributes can be fetched from the calculated non-volatile memory address, the attributes can be stored in the volatile memory, and a status in the set of MMIO register 115-140 can be set by the hybrid media controller 155. In one implementation, the address generator 170 can generate a non-volatile memory address based on the volatile memory address. The non-volatile memory read/write controller 160 and the volatile memory read/write controller 165 can fetch attributes from the non-volatile memory 110 and store the attributes in the volatile memory 105. Thereafter, the flow control module 175 can set the status register 140 to indicate that the self-indexed data movement between the non-volatile memory (NVM) 110 and the volatile memory (VM) 105 is completed. Accordingly, the MMIO registers, 115-140, non-volatile memory read/write controller 160, volatile memory read/write controller 165 and address generator 170 of the memory module 100 can provide data movement between non-volatile memory and volatile memory. In one implementation, the random read/write access to volatile memory can be utilized for feature read after sampling in graph neural network (GNN) applications.

Figure 7:
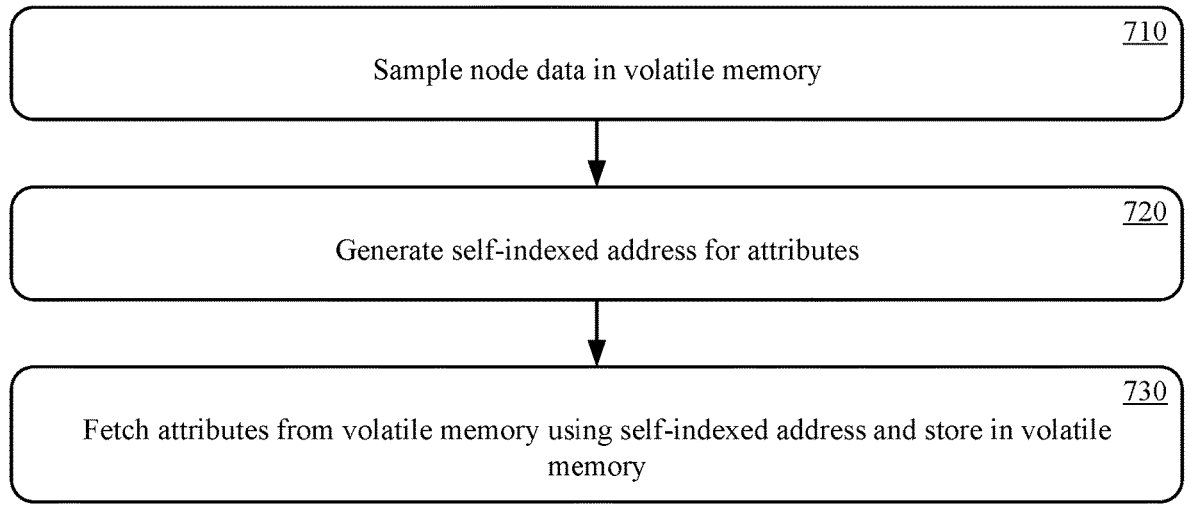
FIG. 7 illustrates a method of self-indexed data movement for node sampling and feature reading after sampling, in accordance with aspects of the present technology.

Referring now to FIG. 7, a method of self-indexed data movement for node sampling and feature reading after sampling, in accordance with aspects of the present technology, is shown. The method of self-indexed data movement between non-volatile memory and volatile memory can be employed for node sampling and attribute fetching. The data movement can include sampling node data in a volatile memory, at 710. In one implementation, node data can be sampled in pre-allocated consecutive dynamic random-access memory 105. The data can be sampled in the non-volatile memory at a specified address plus a count (Index_Base+Index_Count−1). The index base register 120, index count register 125, target base register 130 and operation register 135 of the set of MMIO register 115-140 can also be programmed with the base address in the volatile memory (Index_Base), count (Index_Count), target address in the non-volatile memory (Trget_Base) and memory operation code (OP). At 720, self-indexed addresses can be generated for the attributes. In one implementation, the address generator 170 can read the base address in the volatile memory (Index_Base), count (Index_Count), target address in the non-volatile memory (Trget_Base) from the index base register 120, index count register 125 and target base register 130 and generates the volatile memory address and sends the generated volatile memory address to the volatile memory controller 165. The volatile read/write controller 165 can read sampling results from the volatile memory 105 at the generated volatile memory address. The address generator 170 can also calculate non-volatile memory addresses from the generated address of the sampling results. At 730, attributes can be fetched from the non-volatile memory using the self-indexed address and the fetched attributes can be stored in the volatile memory. In one implementation, non-volatile memory controller 160 can fetch the attributes from the non-volatile memory 110 and the volatile memory controller 165 can store the fetched attributes in the volatile memory 105. The status register 140 in the set of MMIO register 115-140 can then be updated to indicate that the self-indexed data movement operation is completed.

Aspects of the present technology advantageously provide unified memory access including read/write access to volatile memory, bulk read/write access to non-volatile memory, random access to non-volatile memory and self-indexed data movement between non-volatile memory and volatile memory. The memory module in accordance with aspects of the present technology can advantageously be utilized for graph neural network applications. The memory module can advantageously reduce energy consumption for input/output access to the non-volatile memory and volatile memory. Aspects of the present technology can advantageously improve memory bandwidth and reduce access latency. Aspects of the present technology can advantageously reduce host processing overhead for access to the non-volatile memory and volatile memory. Aspects of the present technology can also advantageously provide better support for small memory attribute size.

The following examples pertain to specific technology embodiments and point out specific features, elements, or steps that may be used or otherwise combined in achieving such embodiments.

Example 1 includes a memory module comprising: a volatile memory; a non-volatile memory; a non-volatile memory buffer; a set of memory mapped input/output (MMIO) registers; an interface; and a hybrid media controller configured to provide. The hybrid media controller can be configured to provide read and write access to the volatile memory; bulk read and write access to the non-volatile memory; read and write random access to the non-volatile memory; and self-indexed data movement between the non-volatile memory and the volatile memory.

Example 2 includes the memory module of Example 1, wherein the memory module configured to provide read and write access to the volatile memory comprises: the interface configured to receive a volatile memory address and a random access read operation into the set of MMIO registers; and the hybrid media controller configured to read data of a random access granularity from the volatile memory at the volatile memory address in the set of MMIO registers in response to the random access read operation in the set of MMIO registers, and set a status in the set of MMIO registers.

Example 3 includes the memory module of Example 1, wherein the memory module configured to provide read and write access to the volatile memory comprises: the interface configured to receive a random access write operation into the set of MMIO registers, data of a random access granularity into a buffer, and a volatile memory address into the set of MMIO registers; and the hybrid media controller configured to write data of the random access granularity from the buffer into the volatile memory at the volatile memory address in the set of MMIO registers in response to the random access write operation in the set of MMIO registers, and set a status in the set of MMIO registers.

Example 4 includes the memory module of Example 1, wherein the memory module configured to provide read and write access to the volatile memory comprises: the interface configured to receive a hybrid media controller disable operation into the set of MMIO registers; the interface configured to receive a volatile memory address and a random access read operation into the volatile memory; and the volatile memory to read data of a random access granularity at the volatile memory address in response to the random access read operation.

Example 5 includes the memory module of Example 1, wherein the memory module configured to provide read and write access to the volatile memory comprises: the interface configured to receive a hybrid media controller disable operation into the set of MMIO registers; the interface configured to receive a random access write operation, data of a random access granularity, and a volatile memory address into the volatile memory; and the volatile memory configured to write data of the random access granularity into the volatile memory at the volatile memory address in response to the random access write operation.

Example 6 includes the memory module of Example 1, wherein the memory module configured to provide read and write access to the non-volatile memory comprises: the interface configured to receive a non-volatile memory address and a bulk read operation into the set of MMIO registers; and the hybrid media controller configured to read bulk data from the non-volatile memory at the non-volatile memory address in the set of MMIO registers in response to the bulk read operation in the set of MMIO registers, feed the bulk data into the non-volatile memory buffer and set a status in the set of MMIO registers.

Example 7 includes the memory module of Example 1, wherein the memory module configured to provide read/write access to the non-volatile memory comprises: the interface configured to receive a bulk write operation into the set of MMIO registers, bulk data into the non-volatile memory buffer, and a non-volatile memory address into the set of MMIO registers; and the hybrid media controller configured to write the bulk data from the non-volatile memory buffer into the non-volatile memory at the non-volatile memory address in the set of MMIO registers in response to the bulk write operation in the set of MMIO registers, and set a status in the set of MMIO registers.

Example 8 includes the memory module of Example 1, wherein the memory module configured to provide read/write random access to the non-volatile memory comprises: the interface configured to receive a random access read operation and a non-volatile memory address into the set of MMIO registers; and the hybrid media controller configured to read data of a random access granularity from the non-volatile memory at the non-volatile memory address in the set of MMIO registers in response to the random access read operation in the set of MMIO registers, feed the data of the random access granularity into the non-volatile memory buffer and set a status in the set of MMIO registers.

Example 9 includes the memory module of Example 1, wherein the memory module configured to provide read/write access to the non-volatile memory comprises: the interface configured to receive a random access write operation into the set of MMIO registers, data of a random access granularity into the non-volatile memory buffer, and a non-volatile memory address into the set of MMIO registers; and the hybrid media controller configured to write the data of the random access granularity from the non-volatile memory buffer into the non-volatile memory at the non-volatile memory address in the set of MMIO registers in response to the random access write operation in the set of MMIO registers, and set a status in the set of MMIO registers.

Example 10 includes the memory module of Example 1, wherein the memory module configured to self-indexed data movement between the non-volatile memory and the volatile memory comprises: the interface configured to receive a self-indexed data movement operation into the set of MMIO registers; and a hybrid media controller configured to generate a volatile memory address based on the self-indexed data movement operation in the set of MMIO register, read sampling results from volatile memory at the generated volatile memory address, calculate non-volatile memory address from the volatile memory address, fetch attributes from calculated non-volatile memory address, store the attributes in volatile memory and set a status in the set of MMIO registers.

Example 11 includes the memory module of Example 1, wherein the non-volatile memory buffer comprises a plurality of ping-pong buffer with a size of a memory block of the non-volatile memory.

Example 12 includes the memory module of Example 1, wherein the memory controller includes: a non-volatile memory read/write controller coupled to the non-volatile memory, the set of MMIO registers and the non-volatile memory buffer; volatile memory read/write controller coupled to the volatile memory and the set of MMIO registers; a flow controller coupled to the non-volatile memory read/write controller, the volatile memory read/write controller and the set of MMIO registers; and an address generator coupled to the volatile memory read/write controller and the set of MMIO registers.

Example 13 includes the memory module of Example 12, wherein the set of MMIO registers further includes: a random-access data buffer coupled to the volatile memory read/write controller and configured to hold volatile memory read and write data.

Example 14 incudes the memory module of Example 13, wherein the random-access data buffer comprises a given portion of the non-volatile memory buffer.

Example 15 includes the memory module of Example 1, wherein the set of MMIO registers includes: a feature size register configured to hold a number of bytes of each feature; an index base register configured to hold a sampled node location; an index count register configured to hold a number of sampled node location; a target base register configured to hold a volatile memory address for storing one or more features; an operation register configured to hold an operation code; and a status register configure to hold a current non-volatile memory read/write controller status.

Example 16 includes a method of accessing data comprising: reading and writing data to a volatile memory of a memory mapped space of a memory module; reading and writing bulk data to a non-volatile memory of the memory mapped space of the memory module; reading and writing data of a random access granularity to the non-volatile memory of the memory mapped space; and self-indexed moving data between the non-volatile memory and the volatile memory of the memory module.

Example 17 includes the method according to Example 16, wherein reading and writing data to the volatile memory of the memory mapped space includes: receiving a volatile memory address and a random access read operation into a set of memory mapped input/output (MMIO) registers of the memory mapped space; reading data of a random access granularity from the volatile memory at the volatile memory address in the set of MMIO registers by a hybrid media controller in response to the random access read operation in the set of MMIO registers; and setting by the hybrid media controller a read data status in the set of MMIO registers.

Example 18 includes the method according to Example 16, wherein reading and writing data to the volatile memory of the memory mapped space includes: receiving a random access write operation and a volatile memory address into a set of MMIO registers, and data of a random access granularity into a buffer of the memory mapped space; writing the data of the random access granularity from the buffer into the volatile memory at the volatile memory address in the set of MMIO registers by a hybrid media controller in response to the random access write operation in the set of MMIO registers, and setting by the hybrid media controller a write data status in the set of MMIO registers.

Example 19 includes the method according to Example 16, wherein reading and writing data to the volatile memory of the memory mapped space includes: receiving a hybrid media controller read disable operation into a set of MMIO register; receiving a volatile memory address and a random access read operation into the volatile memory; and reading data of a random access granularity from the volatile memory at the volatile memory address in response to the random access read operation received by the volatile memory.

Example 20 includes the method according to Example 16, wherein reading and writing data to the volatile memory of the memory mapped space includes: receiving a hybrid media controller write disable operation into the set of MMIO registers; receiving a random access write operation, data of a random access granularity and a volatile memory into the volatile memory; and writing the data of the random access granularity into the volatile memory at the volatile memory address in response to the random access write operation received by the volatile memory.

Example 21 includes the method according to Example 16, wherein reading and writing bulk data to a non-volatile memory of the memory mapped space includes: receiving a non-volatile memory address and a bulk read operation into a set of MMIO registers of the memory mapped space; reading bulk data from the non-volatile memory at the non-volatile memory address in the set of MMIO registers into a non-volatile memory buffer by a hybrid media controller in response to the bulk read operation in the set of MMIO registers; and setting by the hybrid media controller a read data status in the set of MMIO registers.

Example 22 includes the method according to Example 16, wherein reading and writing bulk data to a non-volatile memory of the memory mapped space includes: receiving a bulk write operation and a non-volatile memory address into a set of MMIO registers, and bulk data into a non-volatile memory buffer of the memory mapped space; writing the bulk data from the non-volatile memory buffer into the non-volatile memory at the non-volatile memory address in the set of MMIO registers by a hybrid media controller in response to the bulk write operation in the set of MMIO registers; and setting by the hybrid media controller a write data status in the set of MMIO registers.

Example 23 includes the method according to Example 16, wherein reading and writing data of a random access granularity to the non-volatile memory of the memory mapped space of the memory module includes: receiving a random access read operation and a non-volatile memory address into a set of MMIO registers of the memory mapped space; reading data of the random access granularity from the non-volatile memory at the non-volatile memory address in the set of MMIO registers into a non-volatile memory buffer by a hybrid media controller in response to the random access read operation in the set of MMIO registers; and setting a read data status in the set of MMIO registers.

Example 24 includes the method according to Example 16, wherein reading and writing data of a random access granularity to the non-volatile memory of the memory mapped space of the memory module includes: receiving a random access write operation and a non-volatile memory address into a set of MMIO registers, and data of a random access granularity into a non-volatile memory buffer of the memory mapped space; writing the data of the random access granularity from the non-volatile memory buffer into the non-volatile memory at the non-volatile memory address in the set of MMIO registers by a hybrid media controller in response to the random access write operation in the set of MMIO registers; and setting by the hybrid media controller a write status in the set of MMIO registers.

Example 25 includes the method according to Example 16, wherein self-indexed moving data between the non-volatile memory and the volatile memory of the memory module includes: receiving a self-indexed data movement operation into a set of MMIO registers of the memory mapped space; generating a volatile memory address based on the self-indexed data movement operation in the set of MMIO register; reading sample results from volatile memory at the generated volatile memory address; calculating non-volatile memory address from the volatile memory address; fetching attributes from calculated non-volatile memory address; and store the attributes in the volatile memory; and setting a self-indexed data movement status in the set of MMIO registers.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:
1. A memory module comprising:
 a volatile memory;
 a non-volatile memory;
 a non-volatile memory buffer;
 a set of memory mapped input/output (MMIO) registers;
 an interface; and
 a hybrid media controller, wherein the hybrid media controller comprises:

a non-volatile memory read/write controller coupled to the non-volatile memory, the set of MMIO registers and the non-volatile memory buffer;

a volatile memory read/write controller coupled to the volatile memory and the set of MMIO registers;

a flow controller coupled to the non-volatile memory read/write controller, the volatile memory read/write controller and the set of MMIO registers; and an address generator coupled to the volatile memory read/write controller and the set of MMIO registers, and wherein the hybrid media controller is configured to provide:

read and write access to the volatile memory;
 bulk read and write access to the non-volatile memory;
 read and write random access to the non-volatile memory; and
 self-indexed data movement between the non-volatile memory and the volatile memory.

2. The memory module of claim 1, wherein the memory module configured to provide read and write access to the volatile memory comprises: the interface configured to receive a volatile memory address and a random access read operation into the set of MMIO registers; and the hybrid media controller configured to read data of a random access granularity from the volatile memory at the volatile memory address in the set of MMIO registers in response to the random access read operation in the set of MMIO registers, and set a status in the set of MMIO registers.

3. The memory module of claim 1, wherein the memory module configured to provide read and write access to the volatile memory comprises:

the interface configured to receive a random access write operation into the set of MMIO registers, data of a random access granularity into a buffer, and a volatile memory address into the set of MMIO registers; and the hybrid media controller configured to write data of the random access granularity from the buffer into the volatile memory at the volatile memory address in the set of MMIO registers in response to the random access write operation in the set of MMIO registers, and set a status in the set of MMIO registers.

4. The memory module of claim 1, wherein the memory module configured to provide read and write access to the volatile memory comprises:

the interface configured to receive a hybrid media controller disable operation into the set of MMIO registers;

the interface configured to receive a volatile memory address and a random access read operation into the volatile memory; and the volatile memory to read data of a random access granularity at the volatile memory address in response to the random access read operation.

5. The memory module of claim 1, wherein the memory module configured to provide read and write access to the volatile memory comprises:

the interface configured to receive a hybrid media controller disable operation into the set of MMIO registers;

the interface configured to receive a random access write operation, data of a random access granularity, and a volatile memory address into the volatile memory; and the volatile memory configured to write data of the random access granularity into the volatile memory at the volatile memory address in response to the random access write operation.

6. The memory module of claim 1, wherein the memory module configured to provide read and write access to the non-volatile memory comprises:

the interface configured to receive a non-volatile memory address and a bulk read operation into the set of MMIO registers; and the hybrid media controller configured to read bulk data from the non-volatile memory at the non-volatile memory address in the set of MMIO registers in response to the bulk read operation in the set of MMIO registers, feed the bulk data into the non-volatile memory buffer and set a status in the set of MMIO registers.

7. The memory module of claim 1, wherein the memory module configured to provide read/write access to the non-volatile memory comprises:

the interface configured to receive a bulk write operation into the set of MMIO registers, bulk data into the non-volatile memory buffer, and a non-volatile memory address into the set of MMIO registers; and the hybrid media controller configured to write the bulk data from the non-volatile memory buffer into the non-volatile memory at the non-volatile memory address in the set of MMIO registers in response to the bulk write operation in the set of MMIO registers, and set a status in the set of MMIO registers.

8. The memory module of claim 1, wherein the memory module configured to provide read/write random access to the non-volatile memory comprises:

the interface configured to receive a random access read operation and a non-volatile memory address into the set of MMIO registers; and the hybrid media controller configured to read data of a random access granularity from the non-volatile memory at the non-volatile memory address in the set of MMIO registers in response to the random access read operation in the set of MMIO registers, feed the data of the random access granularity into the non-volatile memory buffer and set a status in the set of MMIO registers.

9. The memory module of claim 1, wherein the memory module configured to provide read/write access to the non-volatile memory comprises:

the interface configured to receive a random access write operation into the set of MMIO registers, data of a random access granularity into the non-volatile memory buffer, and a non-volatile memory address into the set of MMIO registers; and the hybrid media controller configured to write the data of the random access granularity from the non-volatile memory buffer into the non-volatile memory at the nonvolatile memory address in the set of MMIO registers in response to the random access write operation in the set of MMIO registers, and set a status in the set of MMIO registers.

10. The memory module of claim 1, wherein the memory module configured to self-indexed data movement between the non-volatile memory and the volatile memory comprises:

the interface configured to receive a self-indexed data movement operation into the set of MMIO registers; and a hybrid media controller configured to generate a volatile memory address based on the self-indexed data movement operation in the set of MMIO register, read sampling results from volatile memory at the generated volatile memory address, calculate non-volatile memory address from the volatile memory address, fetch attributes from calculated non-volatile memory address, store the attributes in volatile memory and set a status in the set of MMIO registers.

11. The memory module of claim 1, wherein the non-volatile memory buffer comprises a plurality of ping-pong buffer with a size of a memory block of the non-volatile memory.

12. The memory module of claim 1, wherein the set of MMIO registers further includes:
a random-access data buffer coupled to the volatile memory read/write controller and configured to hold volatile memory read and write data.

13. The memory module of claim 12, wherein the random-access data buffer comprises a given portion of the non-volatile memory buffer.

14. The memory module of claim 1, wherein the set of MMIO registers includes:
a feature size register configured to hold a number of bytes of each feature;
an index base register configured to hold a sampled node location;
an index count register configured to hold a number of sampled node location;
a target base register configured to hold a volatile memory address for storing one or more features;
an operation register configured to hold an operation code; and
a status register configure to hold a current non-volatile memory read/write controller status.

15. A method of accessing data comprising:
reading and writing data to a volatile memory of a memory mapped space of a memory module;
reading and writing bulk data to a non-volatile memory of the memory mapped space of the memory module;
reading and writing data of a random access granularity to the non-volatile memory of the memory mapped space; and
moving self-indexed data between the non-volatile memory and the volatile memory of the memory module,
wherein reading and writing data to the volatile memory of the memory mapped space includes:
receiving a volatile memory address and a random access read operation into a set of memory mapped input/output (MMIO) registers of the memory mapped space;
reading data of a random access granularity from the volatile memory at the volatile memory address in the set of MMIO registers by a hybrid media controller in response to the random access read operation in the set of MMIO registers; and
setting by the hybrid media controller a read data status in the set of MMIO registers.

16. The method according to claim 15, wherein reading and writing data to the volatile memory of the memory mapped space includes:
receiving a random access write operation and a volatile memory address into a set of MMIO registers, and data of a random access granularity into a buffer of the memory mapped space;
writing the data of the random access granularity from the buffer into the volatile memory at the volatile memory address in the set of MMIO registers by a hybrid media controller in response to the random access write operation in the set of MMIO registers, and setting by the hybrid media controller a write data status in the set of MMIO registers.

17. The method according to claim 15, wherein reading and writing data to the volatile memory of the memory mapped space includes:
receiving a hybrid media controller read disable operation into a set of MMIO register;
receiving a volatile memory address and a random access read operation into the volatile memory; and
reading data of a random access granularity from the volatile memory at the volatile memory address in response to the random access read operation received by the volatile memory.

18. The method according to claim 15, wherein reading and writing data to the volatile memory of the memory mapped space includes:
receiving a hybrid media controller write disable operation into the set of MMIO registers;
receiving a random access write operation, data of a random access granularity and a volatile memory into the volatile memory; and
writing the data of the random access granularity into the volatile memory at the volatile memory address in response to the random access write operation received by the volatile memory.

19. The method according to claim 15, wherein reading and writing bulk data to a non-volatile memory of the memory mapped space includes:
receiving a non-volatile memory address and a bulk read operation into a set of MMIO registers of the memory mapped space;
reading bulk data from the non-volatile memory at the non-volatile memory address in the set of MMIO registers into a non-volatile memory buffer by a hybrid media controller in response to the bulk read operation in the set of MMIO registers; and
setting by the hybrid media controller a read data status in the set of MMIO registers.

20. The method according to claim 15, wherein reading and writing bulk data to a non-volatile memory of the memory mapped space includes:
receiving a bulk write operation and a non-volatile memory address into a set of MMIO registers, and bulk data into a non-volatile memory buffer of the memory mapped space;
writing the bulk data from the non-volatile memory buffer into the non-volatile memory at the non-volatile memory address in the set of MMIO registers by a hybrid media controller in response to the bulk write operation in the set of MMIO registers; and
setting by the hybrid media controller a write data status in the set of MMIO registers.

21. The method according to claim 15, wherein reading and writing data of a random access granularity to the non-volatile memory of the memory mapped space of the memory module includes:
receiving a random access read operation and a non-volatile memory address into a set of MMIO registers of the memory mapped space;
reading data of the random access granularity from the non-volatile memory at the non-volatile memory address in the set of MMIO registers into a non-volatile memory buffer by a hybrid media controller in response to the random access read operation in the set of MMIO registers; and
setting a read data status in the set of MMIO registers.

22. The method according to claim 15, wherein reading and writing data of a random access granularity to the non-volatile memory of the memory mapped space of the memory module includes:
- receiving a random access write operation and a non-volatile memory address into a set of MMIO registers, and data of a random access granularity into a non-volatile memory buffer of the memory mapped space;
- writing the data of the random access granularity from the non-volatile memory buffer into the non-volatile memory at the non-volatile memory address in the set of MMIO registers by a hybrid media controller in response to the random access write operation in the set of MMIO registers; and
- setting by the hybrid media controller a write status in the set of MMIO registers.

23. The method according to claim 15, wherein self-indexed moving data between the non-volatile memory and the volatile memory of the memory module includes:
- receiving a self-indexed data movement operation into a set of MMIO registers of the memory mapped space;
- generating a volatile memory address based on the self-indexed data movement operation in the set of MMIO register;
- reading sample results from volatile memory at the generated volatile memory address;
- calculating non-volatile memory address from the volatile memory address;
- fetching attributes from calculated non-volatile memory address; and
store the attributes in the volatile memory; and
- setting a self-indexed data movement status in the set of MMIO registers.

* * * * *